US008200649B2

(12) United States Patent
Bennett

(10) Patent No.: US 8,200,649 B2
(45) Date of Patent: Jun. 12, 2012

(54) IMAGE SEARCH ENGINE USING CONTEXT SCREENING PARAMETERS

(75) Inventor: James D. Bennett, Hroznetin (CZ)

(73) Assignee: Enpulz, LLC, Chicago, IL (US)

( * ) Notice: Subject to any disclaimer, the term of this patent is extended or adjusted under 35 U.S.C. 154(b) by 476 days.

(21) Appl. No.: 12/415,651

(22) Filed: Mar. 31, 2009

(65) Prior Publication Data

US 2009/0287669 A1 Nov. 19, 2009

Related U.S. Application Data

(63) Continuation-in-part of application No. 12/185,796, filed on Aug. 4, 2008, and a continuation-in-part of application No. 12/185,804, filed on Aug. 4, 2008.

(60) Provisional application No. 61/052,744, filed on May 13, 2008.

(51) Int. Cl.
*G06F 7/00* (2006.01)
(52) U.S. Cl. .......................... 707/706; 707/705; 707/708
(58) Field of Classification Search .................. 707/705, 707/706
See application file for complete search history.

(56) References Cited

U.S. PATENT DOCUMENTS

2006/0069675 A1* 3/2006 Ogilvie ............................ 707/3
2006/0218122 A1* 9/2006 Poston et al. ..................... 707/1

* cited by examiner

*Primary Examiner* — Fazlul Quader
(74) *Attorney, Agent, or Firm* — Garlick & Markison; Bruce E. Garlick

(57) ABSTRACT

An image search engine server that comprises an image search engine, capable of performing image searches based on the context of a search operation. The context of the search is derived from a built-in thesaurus and/or a dictionary. For a thesaurus-based algorithm, the approach is to send a query back to the user, who can select the image search domain, sub-domain, and other hierarchical search refinements from one or more dropdown menus. The items in the dropdown menus that the user selects during the "query back" are used to augment the search string entered by the user to better refine the image search. If the user entered search string is a single string of dictionary word or words or the dictionary mode is elected, then synonyms for that search string are used to generate the augmented search string for the final context-based search operation. By using the dictionary or thesaurus approach, a user search string can be augmented to result in improved image search results.

18 Claims, 9 Drawing Sheets

Dictionary 603

- Word1-Synonym1, Synonym2, Synonym3, ........ 605
- Word2-Synonym1, Synonym2, Synonym3, ........ 607
- Word3-Synonym1, Synonym2, Synonym3, ........ 609

| User Entered Search String 703 | Domain Name 705 | Sub-Domain Name 707 | Category Name 709 | Subcategory Name 711 | List of Search Object Names 713 |

(b)

| User Entered Search String 715 | Synonyms for the User Entered Search String Derived from the Search Engine Dictionary 717 |

FIG. 7

IMAGE SEARCH ENGINE USING CONTEXT SCREENING PARAMETERS

CROSS REFERENCES TO PRIORITY APPLICATIONS

The present application:

(1) is a continuation in part of U.S. Utility application Ser. No. 12/185,796, filed Aug. 4, 2008;

(2) is a continuation in part of U.S. Utility application Ser. No. 12/185,804, filed Aug. 4, 2008; and (3) claims priority under 35 U.S.C. 119(e) to U.S. Provisional Application Ser. No 61/052,744, filed May 13, 2008, all of which are incorporated herein by reference in their entirety for all purposes.

BACKGROUND

1. Technical Field

The present invention relates generally to Internet searching, and more particularly to performing image searches over the Internet.

2. Related Art

Currently, text based search engines are normally used to find image content over the Internet. When using text words or descriptors correlated to image file names or Meta data to find images, it is difficult for a person who is not well versed in the search operation to get more focused and relevant search results. Too few words in the text search string lead to too many search results that are not of interest or relevant to the user. If the user tries to add more words into the search string, aiming to retrieve results of high relevance, there is a tendency that the search results getting more unfocussed. It is often the user's sole responsibility to construct an efficient search string using logical AND, OR, etc., operators which can help in retrieving more relevant image search results, and the crafting of a sufficient search string may take many tries or may be frustrated entirely in the end. For a novice user, without proper knowledge of using the search engine with such logical operators, it is simply impossible to perform efficient image searching on the Internet.

Presently, search engines do not differentiate between a text and image search. When the search results are presented to the user, contextually relevant images maybe presented deep inside a huge or long search result list of hundreds or thousands of images. Under such situations, the user may fail to identify the relevant images from the large search result list. This results in the user putting in a substantial amount of effort that will then become more frustrating for the user during the image search operation. Also, the isolated images that are also part of the text pages may further complicate the search operation adding confusion to the user.

The current image search engines do not help in screening the images presented to a user in response to a text search in a manner that is more contextual based on the use and environment where the picture resides. When the user enters a search string for searching images of his concern or perspective, it may so happen that lots of irrelevant images are also presented to him, based on the matching of a single word, not the more revealing surround content. Most of the times, the presented results will be so large that the user will fail to find the best image, or any relevant image at all. This aspect of lack of focus and context awareness of current image search engines is very serious in some situations. For example, when young children are looking for some images or pictures of their choice; it may so happen that they get adult image content or porn pictures accidentally mixed in with relevant pictures, a very serious drawback to be dealt with in the current image search algorithms.

Also, current search engines do not learn or understand what the user find relevant or what a user is looking for by the way of search interactions. As a consequence of this the search engine cannot track what the user is looking for during browsing a webpage. Thus, any event that happens during a search session such as user selecting a word, or phrase on the current webpage will not be considered by search engine to determine what images or content the user may be interesting in. Due to lack of this feature, further refinement of the search string during a search session is not possible. As a result of this the search results will often not be relevant to what the user is looking for.

There are some search engines which can query users only on a rudimentary basis for selecting the specific search domains or areas, but the search operations performed are limited to those domains only and the search engines do not address the problem of optimizing relevant search results to the user. Such search engines can not be considered as general purpose search engines, whose objective is to generate more focused search results from the web servers hosting images on the entire Internet, rather than a single or few limited domains of data/images. Basically, such domain-specific search engines are personalized search engines, which do search operations only within the domains of someone's local interest but not to a broad user's interest. Thus, search operations leading to limited domains will not suit the purpose of the users all the time, as what the user desires in terms of data and images maybe elsewhere in a different domain or search space.

Current search engines do not maintain a centralized database and update it periodically based on the routine search operations performed by the users to make the search results more focused or making them more contextual. Normally, visited sites through search operations are maintained in a search database, but such format of storage in a search database cannot be utilized for making the search operation more efficient during the subsequent search operations. Also, the mere link-based databases, which a search server maintains for normal Internet operation, can not help in refining image search queries for the user, thus a refined or augmented search string can not be derived for focused and efficient context-based image search operation. Therefore, a need exists for a more effective and efficient way of searching Internet-based image content.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 6 shows a block diagram illustrating the outline of an image search engine dictionary, in accordance with one embodiment;

FIG. 7 is a perspective diagram illustrating an augmented image search string generated by the context manager based on the image search engine thesaurus and dictionary lookup described per FIGS. 5-6;

DETAILED DESCRIPTION OF THE DRAWINGS

Figure 1:
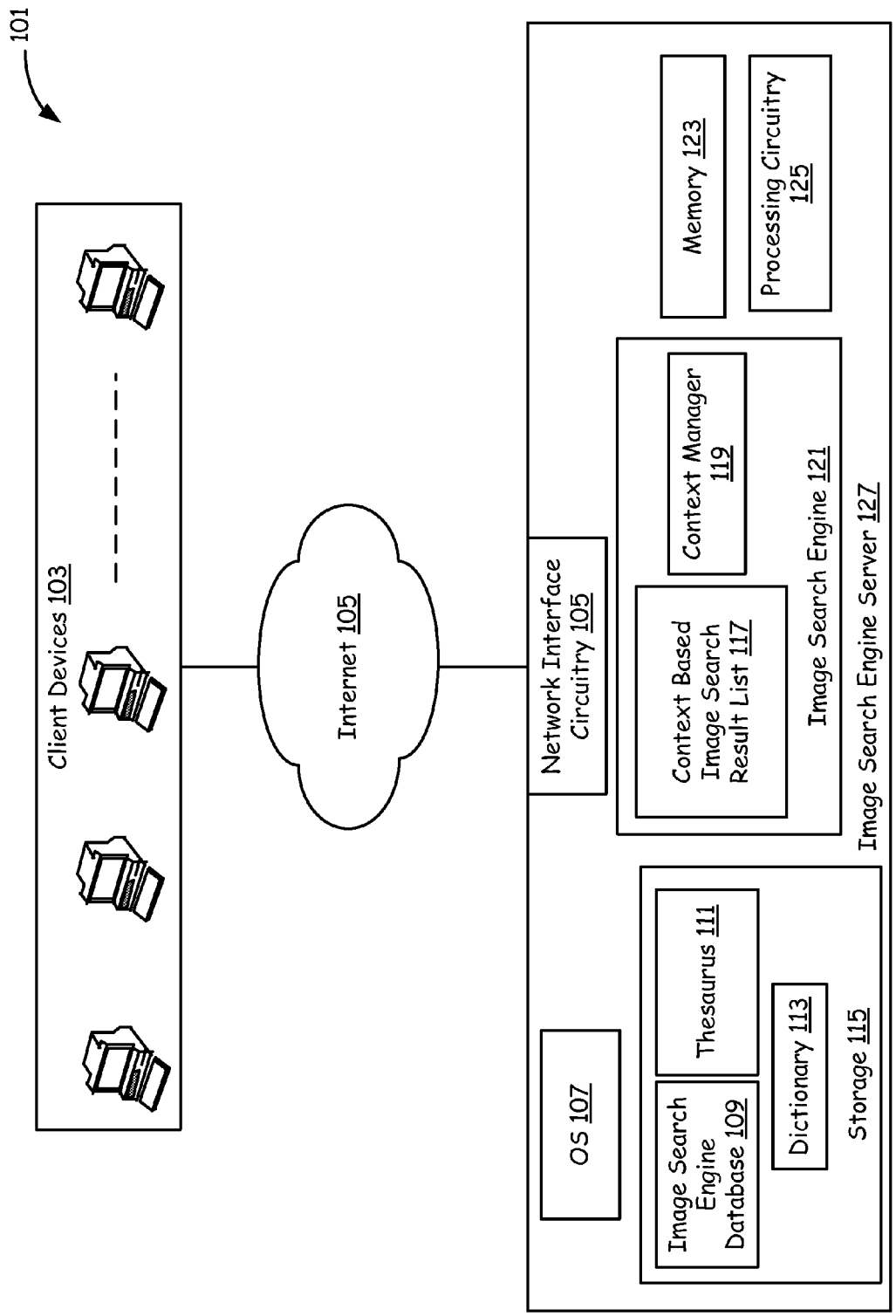
FIG. 1 is a system block diagram illustrating a search engine that supports a context-based image search operation.

Unlike any other search operation performed over the Internet, such as text searches, document searches, binary searches, etc., there is a dearth of capable search engines for image content on the Internet. Those applications and programs that are available for searching images are not very effective as they simply match a text search string typed in by a user to a file name of an image or maybe some short metadata attached to the image file. If a user searches for "balloons," expecting to find pictures of birthday party balloons, the search may return page after page of hot air balloon photos or weather balloon pictures simply because "balloon" is found in the name or short Meta data attached to these pictures. If the user then limits the search to "pink balloons for kids birthday party", the simple image search algorithms may not find a lot of this text in the image file names or metadata, and return equally poor information to the user. In effect, this form of searching ensure that the best pictures, cartoons, images, graphics, clipart, etc, of kids balloons are missed by the user. Many users find that a picture or an image can convey information more effectively or be more pertinent to search than Internet text-based information. A photograph of an object living or nonliving may be a more useful piece of information to a user than any text or audio file describing the object orally or through a written language form. Also, other advantages of image transmission across the Internet are their ability to be significantly data-compressed, as opposed to text messages. The application of image search and processing finds application in several fields particularly to give an example is, in security, crime investigations and law enforcement, medical applications, on-line publishing, etc.

Further, education through the Internet is a very effective medium that often must involve learning through images, multi-media, videos, pictures, or other graphic mediums. Image based education can be more advantageous than education through a specific written or spoken language, which fundamentally involves lots of text based processing and presentations. The amount of information conveyed through text or audio processing can be much less effective and in the end more expensive than learning via multimedia, videos, images, pictures, or other graphical content. When using graphical Internet-based education, one has to be very careful with and concerned about the image content that is downloaded, transferred, and accessed through Internet search operation.

Furthermore, most learning disciplines like Engineering, Science, Business, Management, etc., portraying observations, data, and concepts in the form of graphs, charts, drawings, schematics, graphics, and images each one of them likely are searchable on the Internet as images. It is the image or the pictures in all walks of human life that sometimes allow us to most effectively communicate and learn. So, effective image searching, image processing, and knowledge dissemination through image content on the Internet is a valuable process.

The advancements of image processing technology have made machines able to understand and enhance images, sometimes more capably and effectively than written human languages. This has enhanced the usefulness of images in all aspects of Internet communication, learning, and operation. Also other technologies hitherto infeasible have been made feasible due to image processing advancement; for e.g. image sensor technology has achieved low cost, high resolution integrated circuit chip cameras, which can capture movie frames at the required frame rate for high quality media, picture, and movie processing. It is the need of the hour to implement an Internet image search engine which does searching of the images based on the context of the search to better capitalize on image content over the Internet.

The space industry, military establishments, scientific community, etc., requires real time image processing of image data shot from one or more satellites. The cameras mounted on satellites shoot pictures at high resolution in real time and send them as frames, and the information is finally stored as an images or image frames to generate movies, pictures, or multi-media. In all these situations, it is some form of Internet (or intranet of a corporate company) infrastructure that is chiefly used to process, send, and receive images between group of persons, etc. This processing requires maintaining huge image databases and this data could be enhanced and rendered more useful by involving image search operations, necessitating the need of image search engines that are optimized for context-based image search.

There are standard image formats that have evolved over time and that are available and make it possible to have unique standards to interpret images or pictures over the Internet and through Internet searching. This makes it easy to derive or process information contained in pictorial or multi-media data for computer processing. Various pictorial formats may be easily understood by computers, thereby allowing computers to process, learn, and remember images efficiently, which is sometimes required in certain applications.

Geographical distance between an image source center and an image destination center is not a large constraint given the Internet. However, most of the time searching images on the Internet is a cumbersome and a complex task. Some of the search engines do searching of both images and text/documents, like Yahoo or Google. In that context, the search engines may be required to segregate image contents from that of the text and document information. This necessitates and allows for a new generation of search engines that can search image contents efficiently and exclusively.

Currently, we need search engines that do image searching rather than less concise and less useful searching of text and document-based web pages. A new search algorithm that enables image searching, based on the context, would be a useful tool on the Internet. Often, the screening of images needs to be done from text-based web pages. Also images from certain domains need to be screened from images in some other domains, for example, images from children sites need to be segregated from the images on adult sites. There is also a need to maintain image databases exclusively for the simplicity of maintenance and the ease of access. Images can be stored based on their relevance to a domain, category, etc., which helps ensure a quick and efficient retrieval of the image data during an image search on the Internet.

The ever-increasing need of picture and image exchange through the Internet has found its limitations from within the algorithms that make image search. As the Internet is the source of all sorts of information, whether it is text or image, it is the efficient and context-based retrieval of this data that is highly essential. The context-based search of images makes for the efficient utilization of the Internet infrastructure, and this can reduce junk traffic on the Internet that contains redundant or irrelevant information during Internet search operation, as happens today. Search engines that perform image searching via a search context can provide efficient image search services to groups of people from different disciplines, irrespective of their level of Internet search knowledge.

The embodiments taught herein facilitate various image search operation based on the context of the search, thus resulting in more effective and efficient image searching. The image search engine can understand what the user requirement is, and the image search engine can accordingly modify the user entered search string or the image search algorithm or data access, to perform image search operation that better access only those images that better correlating with the modified or augmented search string and therefore better correlate with the desires of the user.

The context-based image search may require some internal reference/understanding that helps search engine in understanding the context-based searching. In one embodiment, a built-in thesaurus to the browser or search system is specially and optimally formatted. This thesaurus allows the search engine to learn, expand, and contract the context of the search and generate new or augmented search string(s) for performing the image search operation in improved or expanded ways to assist the user. In order for the search engine to work as a general-purpose search engine over time for all users, the thesaurus contents may have to be extensive or exhaustive, and may need to be periodically updated to remain current.

During an image search operation, a user enters a search string in the image search engine. The search engine interacts with the user through a query-back mechanism to refine the user's query (i.e. search string). The search engine queries back the user in a window providing a dropdown menu containing a large list of all the domains from which the image can be searched. The list of all the domains is maintained in the thesaurus in one embodiment. When the user selects one or more domains, the search engine further queries user to identify the sub-domain to which the search string (or the image name) needs to be searched, by way of presenting him with a list of sub-domains derived from the thesaurus. Then user makes a choice of the sub-domain(s). Within one or more specific sub-domain are lists of the categories, to which the search string needs to be searched from. Subsequent queries ask the user to select a subcategory from within the selected category. Within a subcategory there may be many semantically-related searched objects with the search string provided by the user. At each step the search string provided by the user will get augmented by domain, sub-domain, category, sub-category, names, etc. Finally, the augmented search list will be further augmented with all the semantically-related search image object names that are present in a subcategory. Note, the hierarchy of domain, sub-domain, category, subcategory, names taught herein can be shorted to create a hierarchy of just domain and category, or domain-category-name, or a more complex hierarchy with more than 5 levels as discussed above. Therefore the number and detail of each query and the number and detail of the hierarchical construct that derived the query can change to create new embodiments within the scope of the embodiments taught herein.

At end of all the query steps, the search string has grown far bigger and far more useful to the user for searching the image databases than what the user had initially entered. This augmented search string is further constructed after each user response to the query or is constructed at the completion of all queries, and the new augmented search string is managed by a search engine module called a context manager, in accordance with one embodiment. Thesaurus lookup is performed when the user-entered search string is a multiple word or a phrase, indicating the name of the image under search. If the search string is a single word from a dictionary or a single word parsed from a multi-word user entry, then a built-in dictionary lookup may suffice to pick synonyms and generate an augmented search string by the context manager in accordance with the embodiment. Under a single word search string and in one embodiment, it is the user who will guide the image search engine whether to do a thesaurus-based contextual image search or a dictionary-based contextual image search.

In one embodiment, user can also opt for direct image searching wherein the image search will be performed directly based on the user-entered search string (without being automatically further augmented by other words per a dictionary and/or thesaurus). In this situation, the search results are not context-based to begin with. This feature of limited the level of context-based machine-human interaction may be essential if the user is not satisfied with the machine-assisted thesaurus or dictionary based contextual image search operations or this feature may be useful for some other of the user's personal requirements. This direct image search will be useful in the event that the thesaurus or the dictionary has not been updated periodically or maybe is available in the wrong language that the user intends to search with. A direct image search operation will also help in allowing previously unlisted images in the thesaurus to be listed into it. This can happen once, and henceforth that the image be accessible for everyone during further thesaurus based context search.

FIG. 1 is a system block diagram illustrating a search engine or browser-based system that supports context-based image search operations. The perspective block diagram 101 of FIG. 1 is illustrating a search engine supporting the context-based image search operations discussed previously. A plurality of client devices 103 is communicatively coupled to one or more image search engine servers 127, via the Internet 105. The Internet can be replaced with any manner of connection from one device to another device, such as optical interconnect, wireless interconnect, intranet, wireline, combinations thereof, or other networks. The main components of the image search engine server 127 are the network interface circuitry 105 that connects the search engine server 127 to external devices and the Internet, image search engine 121, storage/memory 115, Operating system (OS) 107, Memory 123, and the processing circuitry 125.

The image search engine 121 comprises a copy of the image search result list 117, often stored in its cache, main, random access, disk, or magnetic memory, and the context manager 119 which produces image searches in a manner that is context-based on the user's text input and/or responses to one or more server queries. If a thesaurus-based context generation is opted by the user or server, or selected by default, the user will be queried back through query back window which facilitates a dropdown menu of domains, categories, etc., which are defined in or in conjunction with the thesaurus. A Thesaurus-based image search via thesaurus 111 will be the default option if the user enters an image search string that is not a single dictionary-based word or if it is a multiple word phrase that requires more grammatical or complex processing to decipher. Otherwise, for simple or single word search strings, the image search can be conducted using the dictionary 113, by doing a dictionary-based context search as opposed to a thesaurus-based approach. In some embodiments, the server may enable a dual thesaurus/dictionary approach, where the thesaurus parses more complex terms and sentences while the dictionary is consulted for smaller phrases and words to get more insight into the user search string. Therefore, in some embodiments, the thesaurus and dictionary can be accessed simultaneously, together, or in series to finish search string processing. In a thesaurus-based image search, semantically similar image search object names from within a category or a subcategory of the thesaurus are picked by the context manager to add to or augment the user-entered image search string. The image search engine 121 then uses this augmented search string to perform the image search operation to find more meaningful and relevant image material for the user.

For a single word or a default dictionary based words, a dictionary-based context search using the dictionary 111 of FIG. 1 will be selected and performed by the context manager 119 of server 127. In this situation, the dictionary meaning of the user entered single word image search string will be augmented by various synonyms or synonymous words/phrases picked by the context manager 119 to aid in the search. Subsequently, the image search engine 121 does the image search operation and display the search result list to the user. If the user wishes to perform thesaurus based context image search to a single word image search string, then it is possible to do so by an option to select the thesaurus, instead of the default (for dictionary words) dictionary based context.

The image search engine database 109 contains the table of the links already visited by several users over the Internet, in various earlier image search sessions. If some other users request the same images whose link(s) are already in the database will be readily displayed without need to contact the respective web server which hosts that particular image. These cached image links will be maintained for some specific duration after which they are deleted from the database for the storage space requirement constraints. Memory unit 123 is the actual system memory used during any computation by the processing circuitry 125. The memory is typically random access memory, dynamic random access memory (DRAM), static random access memory (SRAM), cache, magnetic disk storage, non-volatile memory, electrically programmable read only memory (EPROM), electrically erasable read only memory (EEPROM), magnetic memory, optical memory, laser disks, other types of storage or combinations thereof. The processing circuitry 125 is often one or more central processing units, microcontrollers, multi-core CPUs, graphics processing units (GPUs), digital signal processors (DSPs), application specific integrated circuits (ASICs), programmable gate arrays (PGAs), control logic, state machines, combinations thereof, or other processing circuitry.

Figure 2:
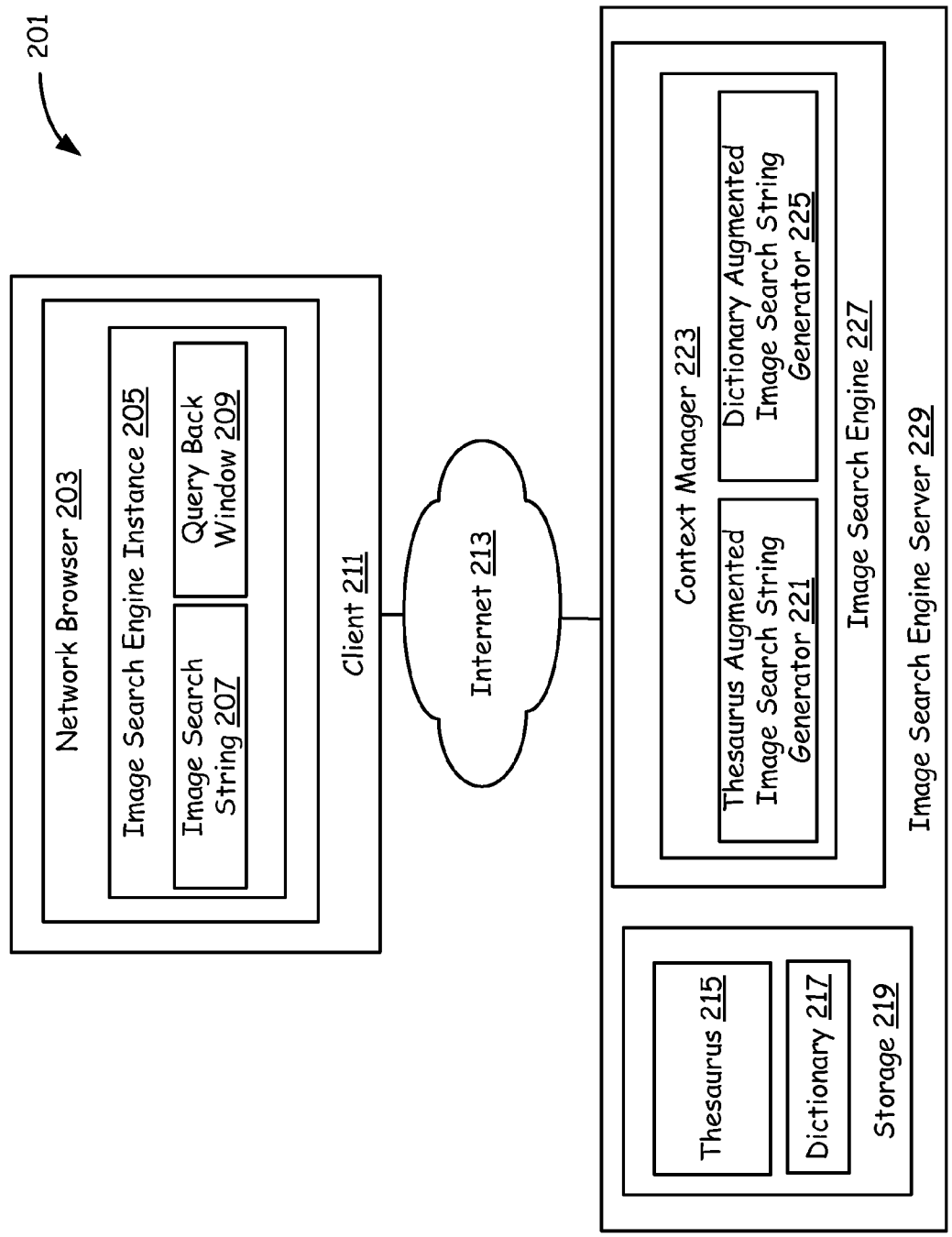
FIG. 2 is a block diagram illustrating the implementation of a context-based search engine using a context manager, in accordance with one embodiment.

FIG. 2 is a block diagram illustrating the implementation of a context-based search engine using a context manager, in accordance with one embodiment illustrated in FIG. 1. The context manager 223 (similar to context manager 119 of FIG. 1) is useful module for a context-based image search engine. To start image searching, users select the basic context generation mode in the image search engine instance window on the client device. The basic context generation mode selections that a user has are thesaurus-based or dictionary-based context generation options and the direct search option. In other cases, a combo thesaurus/dictionary mode is also available.

In most of the search operations, it is the thesaurus-based context search that is used as a default, via the thesaurus augmented image search string generator 221 within image search engine 227. The user enters the image search string in the image search engine window. In response to this entry, the context manager 223 will be executed on the image search engine server to grab all the domain name information from the thesaurus, collect that information into a dropdown menu or similar display mechanism, and present the information to the user. In some cases, the thesaurus processing will require more complex processing that simple a table look-up for similar or synonymous words, as may be the simpler case for the dictionary mode of operation. The thesaurus processing can use grammatical processing similar to that used in modern word processing programs to parse grammar, structure, and meaning from an entered string of information. In some cases, the thesaurus may call upon the dictionary to aid in its processing. In other cases, the thesaurus is simply a hierarchical organization of search domain categories and subcategories that a user can select within to refine a search to a more focused and relevant image/data domain. After processing and displaying the domain name information, the user selects one or more domain names from the dropdown menu, based on his knowledge of the image searching he requires or with some judicious starting guesswork. Subsequently, the image search engine learns this information, and instantly the context manager modifies the image search string by one level to incorporate searching of the selected domain sets of data. Thereafter, the context manager interacts with the thesaurus and grabs all the sub-domain names under the previously selected domain(s) and provides another dropdown menu to the user. User repeats the selections of sub-domains as previously discussed for domains. The context manager modifies the user image search string by another level by adding the sub-domain name/information to the search query provided by the user. This process is repeated until the image search string is modified by all the levels based on the number of levels of image database granularity that are built into the thesaurus. In the example case discussed herein, four levels of hierarchical structure are considered by the thesaurus, and these levels are the domain level, sub-domain level, category level, and subcategory level for the simplicity of illustration. In each level, less image data, but more interrelated or relevant image text data is pooled together and associated with one another for more effective searching of densely populated relevant content.

In a large database, the number of levels in the thesaurus can further be nested shallower or deeper that described above to accommodate variety of the image object types that are coming from variety of different fields. In the last level of the hierarchical tree data structure, all words or phrases that a similar or synonymous with the search requested by the user are resident. The context manager picks all of the names corresponding to the respective images and adds them to previously modified image search string. The names or words in the last level are all semantically related words, and might not be simply synonymous during the thesaurus based context generation.

If the option of dictionary-based searching is chosen earlier, then the dictionary-based context will be generated, via the dictionary augmented image search string generator 225 within image search engine 227 of FIG. 2. This option works for the search strings that can be parsed for simple dictionary meaning in a relatively simple manner. The dictionary should be of special format where each word in the dictionary has added to it all the synonyms or related words or phrases for each word. This helps the context manager to pick those synonyms automatically and add to the user entered search string, thereby generating the augmented image search string that can be used by the server 229 to perform the image search. The image search engine uses the augmented image search string for searching all the relevant images from the Internet, which will have high probability of context relevance to what the user is looking for.

It is also possible to allow the dictionary and thesaurus querying mechanism to elect phrases or words that should not be search or not included with the search results. For example, if someone is searching on the word "Ram," this word could mean an animal, a rock bank, a portion of an oil rig drill bit, or random access memory, for example. By recording these common inaccuracies in the thesaurus data structure, the server can help the user, through queries, filter out content areas that they will certainly not be interested in viewing or using.

The block diagram 201, of FIG. 2 is illustrating the implementation of a context-based search engine using a context manager 223, in accordance with one embodiment. The client device 211, has an instance of the image search engine 205 opened in a network browser window 203. The main feature of the context-based image search operation is the query-back window 209 that is presented to the user one or multiple times in response to the user's entry of the image search string 207. The client device is communicatively coupled to the image search engine server 229 (server 127 of FIG. 1 repeated), via the Internet 213 (same as the Internet 105 of FIG. 1 repeated).

The context manager 223 (same as context manager 119 of FIG. 1 repeated) is shown in more detail in FIG. 2. The context manager 223 of FIG. 2 contains the context generation features/modules that are selected and used based on the user's choice or machine/control panel default settings opted at the beginning of the image search session or set up by IT specialists or the user. This selection usually enables one mode, such as thesaurus-based or a dictionary-based search context generation. The thesaurus augmented search string generator 221 is a module within the context manager 223 that is executed when the user enters an image search string and thesaurus-based context searching is enabled. If a dictionary context option is selected, then the dictionary augmented search string generator 225 module within the context manager 223 is executed when the user enter enters an image search string. Once the augmented image search string is generated by one or more of generators 221 and 225 through interactive queries with the user, the image search engine 229 will perform the search operation on the Internet to search and deliver the contextually relevant images. The thesaurus 215 (thesaurus 111 of FIG. 1 repeated) and dictionary 217 (same as dictionary 113 of FIG. 1 repeated) in the storage 219 (same as storage 115 of FIG. 1 repeated) are constantly updated to reflect the expansion or addition of new image information or links under newer domains or new hierarchies in the thesaurus' text structure.

Figure 3:
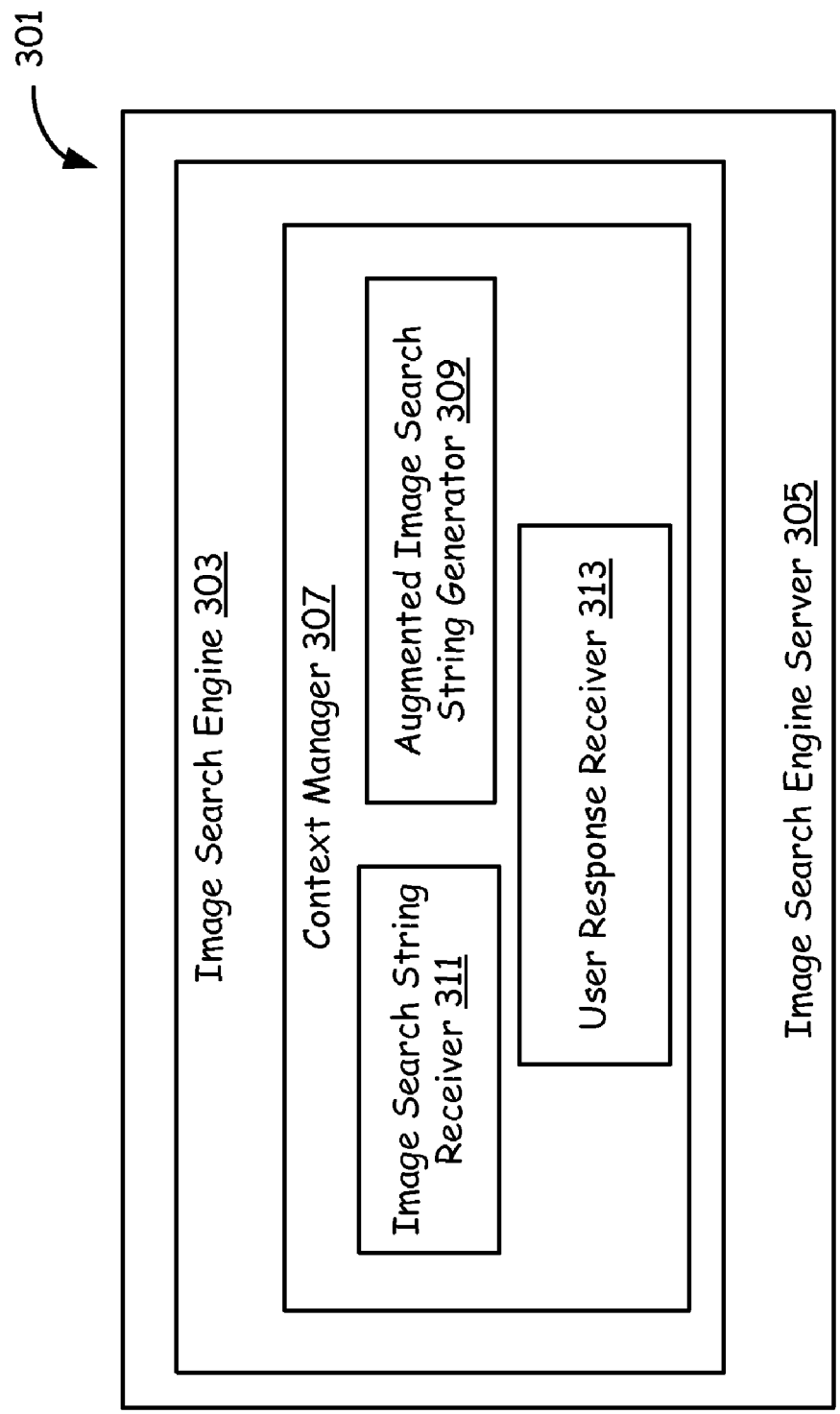
FIG. 3 is a block diagram illustrating the details of the functional features of a context manager of FIG. 2, in accordance with one embodiment.

FIG. 3 is a block diagram illustrating, the details of the functional features of a context manager, in accordance with one embodiment. When a user enters an image search string, the image search engine on the image search engine server should receive the search string to enable processing of it. In response to the user entering the image search string, the image search engine will present a query-back window to the user that essentially presents a dropdown menu displayed to the user. Subsequently, the user responds by one or more selections that are made in the query back window. The context manager will receive the response/selections from the client device on which the user is performing the image searching. Further, the context manager takes both the user provided image search string and the query back window response to generate the augmented image search string. The augmented search string is then used to provide more comprehensive, meaningful, relevant search operations that provide more comprehensive, meaningful, relevant image search results to the user for his search string.

The block diagram 301 of FIG. 3, is illustrating in more detail the functional features of a context manager that enables the search engine to perform context-based searches using the built-in thesaurus as the control module, in accordance with one embodiment. The image search engine server 305 (server 127 of FIG. 1 repeated) is running image search engine 303 (similar to image search engine 121 of FIG. 1 repeated), and retrieving all the necessary information from a plurality of the client devices as shown in FIG. 1. The context manager 307 (manager 119 of FIG. 1 repeated) generates the necessary context and augmented search terms for a more focused retrieval of the requested image search results.

The context manager has an image search string receiver 311 that is interfaced to by a user operating on the client device. The user interfaces with receiver 311 via the network browser window in which an image search engine instance 205 of FIG. 2 is running. Further, the user responds to the query back window by selecting one or more image search domains of his choice that related or correlate to his search string, and communicates these selections to the image search engine 303, on the image search engine server 305, via a user response receiver module 313 in FIG. 3. The augmented image search string generator 309 assembles the user-provided image search string (captured by receiver 311) with user response data (captured by receiver 313) resulting in the augmented image search string. The augmented image search string is then used by the image search engine to perform the relevant image search operation. Finally, the image search result lists, thumbnails, pictures, or other data are presented back to the user on the client machine 211 of FIG. 2. In this process, the image search engine will retain a copy of the search results 117 of FIG. 1 to update its image search database.

The thesaurus-context generation involves "query back" operations and subsequent response(s) from the user, in accordance with one embodiment. When a user makes a decision whether the search is to be conducted using the thesaurus-based context or a dictionary-based context, by opting at the beginning of the image search session from the image search engine window on the client device for example, the context manger will become aware of what routines to execute and/or what data to load into the memory (from storage), whether thesaurus-based and/or dictionary-based; The thesaurus programs and data are loaded and executed for thesaurus-based context generation, and the dictionary programs and data are loaded for using a dictionary for dictionary-based context generation.

First, the user inputs the image search string using the client device or another input device. The image search string receiver 311 of FIG. 3 receives the image search string entered by the user through network interface circuitry and the Internet or a similar network. Subsequently, the context manager queries back user via a window having a dropdown menu or a like mechanism for receiving user input and provides the entire listed top level search domains or at least the search domains the server determines to be useful to the user given an analysis of the search string. The user responds by selecting one or more of the top level search domains to confine his search domain to specific search criteria, data, and text that is of most relevance to the user's current needs/desires. The user's response receiver 313 of FIG. 3 receives the user's response for the "query back" queries, and generates an augmented search string or augmented search data after each step of the user's response or at the end of the user's multi-tier hierarchical input. A final augmented image search string will be generated and available for use at the end of all "query back" operations, and the server will use this final augmented image search string to perform the context search requested by the user.

Figure 4:
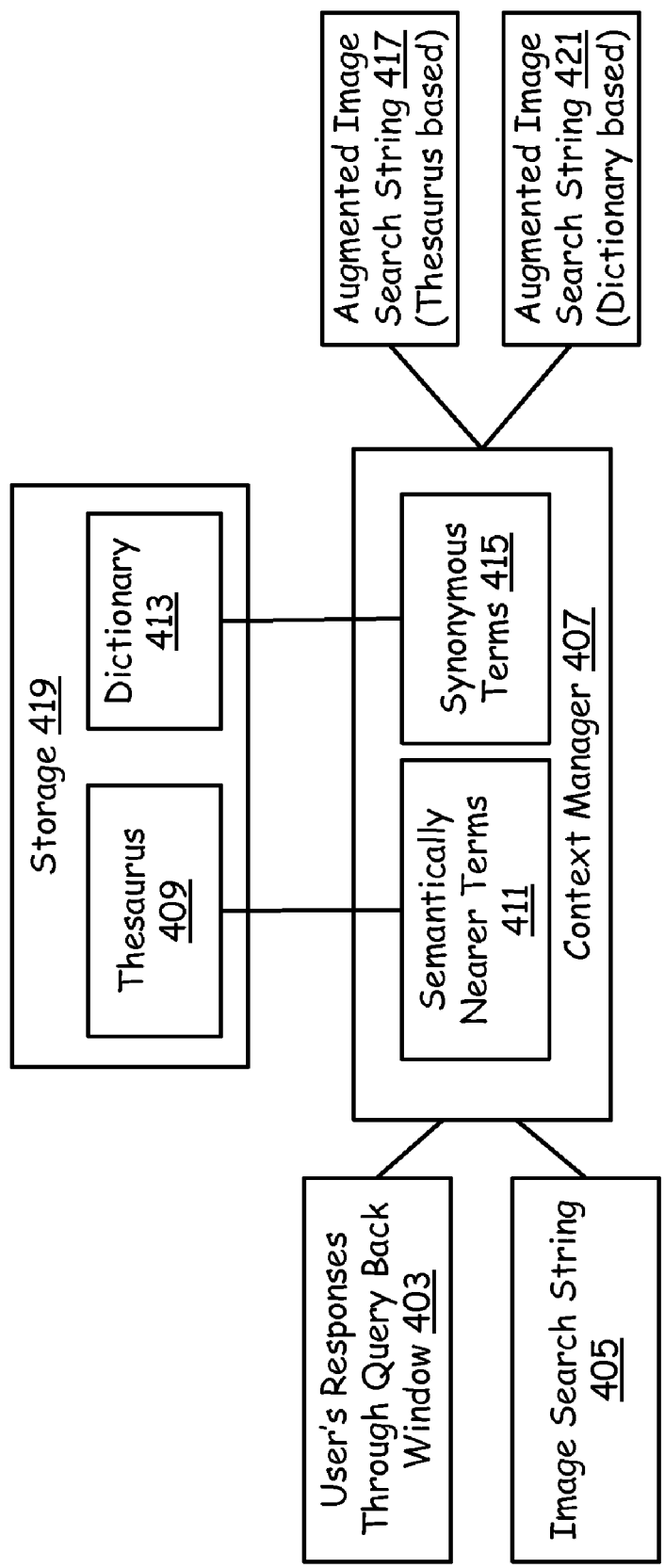
FIG. 4 is a perspective block diagram illustrating, the interaction of a context manger with a client device of previous figures when the system generates search context in accordance with one embodiment.

FIG. 4 is a perspective block diagram illustrating, the interaction of the context manger resident on the server with the client devices illustrated in FIG. 1 when generating the search context data in accordance with one embodiment. The context manager 407 (manager 119 of FIG. 1 repeated) understands the context and requirements of the search, based on the user's interactions and input through the original search string 405 and responses to various queries 403. The image search string 405 (similar to search string 207 of FIG. 2 repeated) comes from the client device 211 of FIG. 2 in response to which the context manager 407 generates a series of very simple queries via a query back window 403, wherein the user simply should to select one or more categories or names from the dropdown list to satisfy the queries for the server software. The user's response through query back window 403 is submitted back to the context manager 407 as shown in FIG. 4. In response to the user input, the context manager 407 can generate the augmented image search string 417 (in a thesaurus-based manner). For the thesaurus-based process, the server uses the image search string 405 and the semantically nearer terms 411 picked from the thesaurus 409 and available in the storage 419.

If the user had opted for the dictionary-based context search at the beginning of the search session or if the user entered an image search string which is a dictionary word, the context manager 407 may derive many synonymous words simply from accessing the dictionary 413, existing in the storage 419. The context manager 407 can assemble or associate all or several of the synonymous words picked from the dictionary with the search string entered by the user, resulting in an augmented image search string 421 or search data structure/database 421 (dictionary based). The image search engine 121 of FIG. 1 does the subsequent search operations for relevant images based on the augmented search string 421. Also, the server may be able to use a hybrid process of a combination of the thesaurus and the dictionary where the processing of the dictionary can aid in the thesaurus processing and vice versa, to generate a hybrid augmented image search string.

Figure 5:
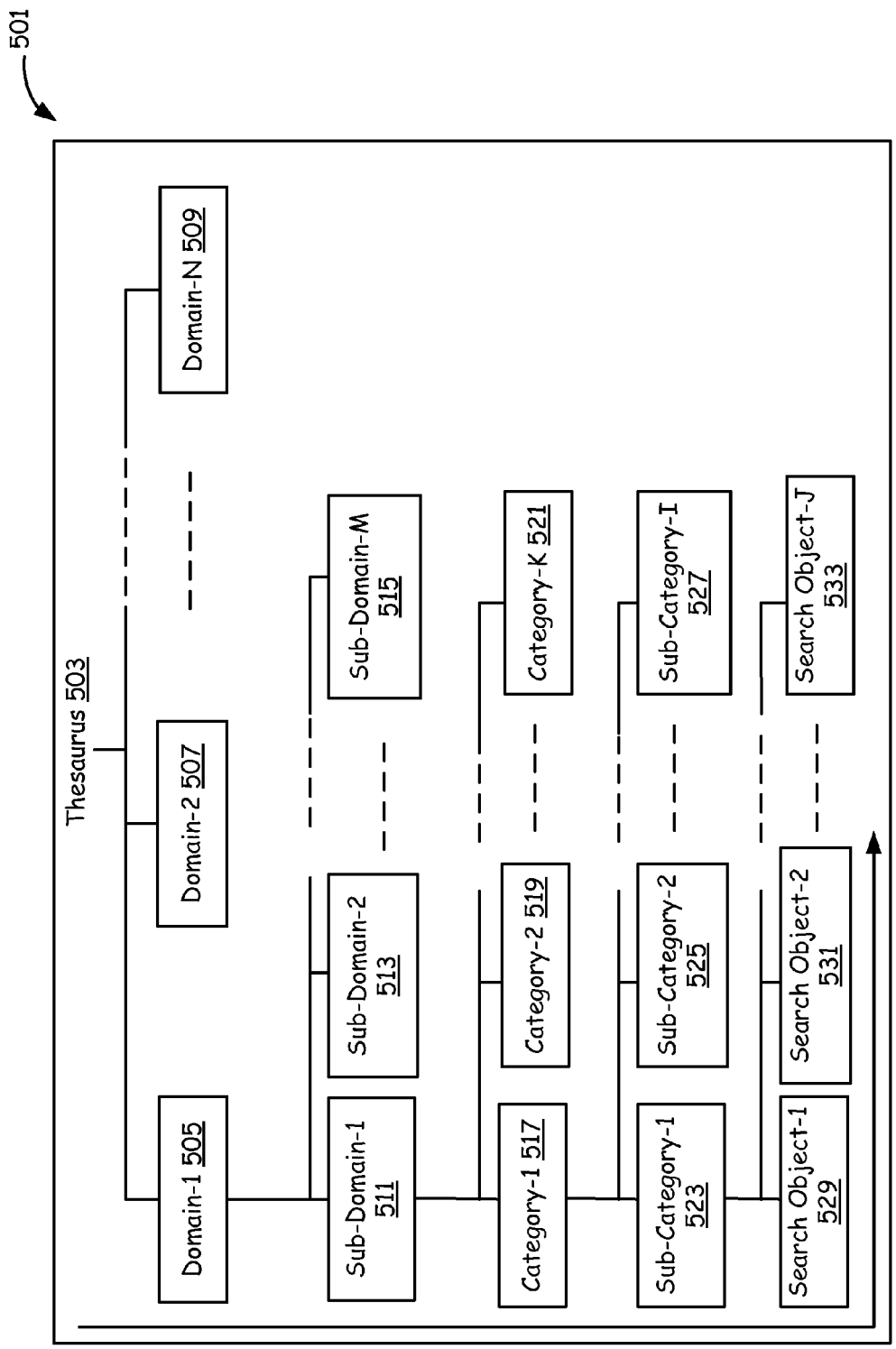
FIG. 5 shows a block diagram of an exemplary configuration of a thesaurus for refining the user's query through a query-back window, in accordance with one embodiment.

FIG. 5 shows a block diagram of an exemplary configuration of a thesaurus for refining the user's query through a query-back window, in accordance with one embodiment. For an effective image search, the structure or configuration of the thesaurus is used for categorizing and listing a huge number of names of the various search objects on the Internet, based on their semantic relations. Basically, the thesaurus organizes graphical, picture, video, artistic, schematic, and other audio-visual information according to relevance to each other in a tree data structure. As a simple example, a domain may be "dogs", with two subdomains being "small dogs" and big dogs", with the sub-domain "small dogs" having two categories "dachshund" and "toy poodle", with "toy poodle" having categories such as "black toy poodle", "white toy poodle", etc., and wherein the search object links, files, or pointers are grouped at the leaf nodes of the tree data structure under search objects. Note that other data structures like linked lists, B trees, etc, can be used to structure, and store information for the thesaurus elements taught herein. In essence, the thesaurus is something similar to a telephone directory where all the telephone numbers are systematically grouped according to various relationships and listed according to their relationships, so that for even a layman can pick a required telephone number by traversing the data structure via user-answered queries.

The image search engine thesaurus will have a list of top-level domain names, and below the top-level domain names there are several intermediate levels with each level item having its own next level list of sub-domains. The lowest level has all the sub-domains expanded into semantically related search objects, via files, pointers, allocated storage, identifiers, and/or other constructs. One can imagine the image search engine thesaurus as a huge tree data structure, with its trunk representing the thesaurus itself and the emerging branches as the domains, and each branch further branching into sub-domains (smaller branch lets), and so on until finally the leaves of the tree are the semantically related search objects/lists/nodes as the final structures in the tree database.

Block diagram 501 of FIG. 5 is an exemplary configuration of a thesaurus wherein a user selects the domain, category, etc., through user responses to a query back window that has a dropdown menu to help refine, focus, and narrow down the user's search, in accordance with one embodiment. FIG. 5 is an example configuration of a thesaurus with just 4 levels (and any number of levels from 1 to N is possible, where N is any integer). In FIG. 5, only 4 levels are indicated for the simplicity of explaining the concept of present invention. In addition, even if N tiers or hierarchies are used, the system may not require a full N number of queries to traverse the tree. many different data structures exist to obtain an N level hierarchy, but settle into all the data that the system needs in less than N user queries (e.g., the user entered initial search string may already allow the thesaurus to confine the sub-tree structures and nodes of the thesaurus that are pertinent to the user). At the first top level of the data structure in FIG. 5, we have the Domain-1 505 to Domain-N 509 illustrates, and these domains indicate a plurality of different top level domain names. The next second level of the hierarchy is indicated under the domain-1 505 in this example, and this next tier of the hierarchy is shown as sub-domains ranging from Sub-domain-1 511 to Sub-domain-M 515 where M is any positive integer. Similarly, all the remaining domains in the top level will lead to a plurality of sub-domains as indicated under the domain-1 505; however, these are not specifically shown in FIG. 5 for simplicity of illustration. A Level further below the Sub-domains 511-515 is the third level in the hierarchy of the data structure containing the categories illustrated as category-1 517 to category-K 521, where K is any positive integer. Similarly, all the remaining sub-domains in FIG. 5 will lead to a plurality of categories as indicated under the sub-domain-1 511, but such is not shown for ease of illustration. At the fourth level, we have the subcategories levels/nodes. Category-1 517 at the third level has sub-category-1

523 to sub-category-I 527 illustrated in FIG. 5, where I is any positive integer. Similarly all the remaining categories at the third level will lead to a plurality of subcategories as indicated under the category-1 517, but such is not illustrated in FIG. 5 for simplicity of illustration. As the data focused in each sub-branch of the tree structure are more interrelated and the domain size of linked images therein gets progressively smaller, the search results are accordingly more focused and relevant as you move down the tree structure. At some point, the user may want to stop the traversing through the tree where the user is at, and not refine the search further. This is possible, and if the user wants to stop at sub-domain 511 for example, or stop at category-2 519, then the thesaurus can gather all the relevant augmented search term data from all the nodes underlying and connected/associated with the node on which the user stopped the query process. The last level is shown to emerging from the subcategory-1 523 in FIG. 5, and this tier of the hierarchy has the items labeled search-object-1 529 to search-object-J 533 where J is any positive integer value. The data at this level contains a plurality of the search object names, identifiers, links, metadata, etc which the image search engine can use to create an augmented search data string or data structure to do searching operation (in the augmented search string) that have more favorable and relevant results for the user.

In one embodiment, the search objects items labeled search-object-1 529 to search-object-J 533, will directly be the links of certain image search sites, text descriptors of interest, metadata, images themselves, or some mixture of many different forms of data type. For example, sometimes the objects 529-533 are the list of links corresponding to restaurants, or shopping centers, etc. If a user for instance is looking for a list of restaurant images, the list of links can readily be displayed to him, instead of searching across the entire Internet for the same search results links. Often, links, addresses, html identifiers, or pointers will be used, as this results in more efficient processing and space utilization within the host of severs that help constitute the Internet. Note that the nodes in the tree structure can connect in a cross-connected manner in some embodiments. For example, a category domain of mammals and a domain of dogs may link through the hierarchy to similar leaf nodes or final data in the end. Therefore, in some data structures, the connections on one node or to certain data items in a node can be shared between many parent nodes in the tree structure of FIG. 5.

FIG. 6 shows a block diagram illustrating the concept of an image search engine dictionary, in accordance with one embodiment. In addition to the thesaurus-based context search, a dictionary-based context generation/search is available for the search operation. The dictionary built into an image search engine has a basic structure or outline as depicted in FIG. 6, in accordance with one embodiment. For each word that a user could input as a part of a search string, there are a number of synonymous words listed in the image search engine dictionary 603. When a single word image search string is entered by a user or a simple short phrase that can be easily parsed into a finite number of simple words, the context manager 119 of FIG. 1 will look for all the synonyms of the words on the search string that are listed in the dictionary 603. Based on the matching and inclusion of synonymous words, phrases, and data, an augmented search string is generated. With the augmented image search string now created, the image search operation can be performed and delivered to the user using the enhanced or augmented image search string from the dictionary.

In one embodiment, the dictionary-based augmented image search string will further be modified to include more context with the help of thesaurus lookup as explained in FIG. 4 and FIG. 5, earlier. This may need to be done because an augmented search string formed by just using the dictionary lookup based image search strings/information may not yield adequate contextual image search results, as the image search string may not have sufficient contextual focus if it is too big or too small.

Block diagram 601 of FIG. 6, illustrates the basic structure or outline of an image search engine dictionary, in accordance with one embodiment. The dictionary 603 contains words, likely listed in the alphabetical order or in some other formal structure, along with the list of their synonyms that is associated with each word. The example dictionary in FIG. 6 shows word1 605, word2 607, word3 609, etc., in an alphabetical order or some other formal order where these words are words that a user can enter as part of a search string. The context manager 119 of FIG. 1 looks into the dictionary 603, finds one or more of the user-entered search string words and uses one, some, or all its synonyms from the dictionary to generate the augmented image search string.

FIG. 7 is a perspective diagram illustrating the augmented image search string generated by the context manager and based on the image search engine thesaurus and/or dictionary lookup operations. A simple but effective approach to generate the image search context is to augment the user supplied image search string. The augmenting words are various words that will narrow down the search domain or space to a more finite and relevant set of image search results. According to one embodiment, the words that narrow down the image search results based on the context are the various levels of domain, sub-domain, etc., names in the search engine thesaurus. In the dictionary based image search context generation, these words may be one or more synonymous words derived from the image search engine dictionary, augmented with the user entered search string, which narrow down or better focus the search results based on the context of the search operation.

An example of augmented image search strings constructed based on FIG. 5 (thesaurus) and FIG. 6 (dictionary) may be created by the context manager and may be structured as shown in the FIGS. 7(a) and (b) respectively. In FIG. 7(a), the (final) augmented image search string is constructed based on the user's response from the client device to various query back operations from the image search engine. The user-entered image search string 703 will be augmented by the domain name 705, which the user selects from the drop-down menu at the first query back, resulting in the "first augmented image search string." The sub-domain name 707 selected by the user from the dropdown menu during the second query back will be augmented to the "first augmented image search string," resulting in a "second augmented image search string". The category name 709 selected by the user from the dropdown menu during the third query back will be augmented to the "second augmented image search string", resulting in the "third augmented image search string." The subcategory name 711 selected by the user from the drop-down menu during the fourth query back will be augmented to the third augmented image search string, resulting in the "fourth augmented image search string." Finally, the list of search objects name 713 from within a selected subcategory from the thesaurus will be augmented to the "fourth augmented image search string," resulting in the "final augmented image search string." Or, in the alternative, some or all of the queries can be captured by the client or the server and only processed intermittently or at the end of the query process to create a final augmented search string. A perspective picture of such a "final augmented image search string" format is depicted in FIG. 7(a), finally which is to perform the image search operation by the image search engine.

In FIG. 7(b), shows a final augmented image search string, constructed by dictionary lookup. User entered image search string 715 which is normally a dictionary-based word (for the dictionary-based context generation), will be augmented by the synonyms of the user entered search string 717. The composite of the two strings viz. 715 and 717 is now the "final augmented image search string" of FIG. 7(b), which the search engine uses to perform the image search operation. In one embodiment, this "final augmented image search string" can further be used as user entered image search string at 703 of FIG. 7(a), for further refinement of the context.

It is important to note that some algorithms and embodiments can query the user to identify just those few key synonyms or thesaurus-based constructs that the user wants out of the structure of FIG. 7. And, the server can ask the user to augment the logic of the search using and, or, not or other logic operators. For example, the user may want pictures of new BMW cars, not used ones, from the year 1987. In this case, the algorithm could identify from the thesaurus, dictionary or search that the search should be /"Bavarian motor works", "BMW", 1987, "new car", "new auto", "new automobile", "new vehicle"/ and the user may be able to modify the search through queries or server assistant to say /"BMW" and "new" and "1987" and (car or auto or automobile or vehicle) not "used"/. Meaning, it may not be enough to simply append several related words together, but to process the context of the query to get only the needed/relevant words assembled into the right logical context to perform the search well.

Figure 8:
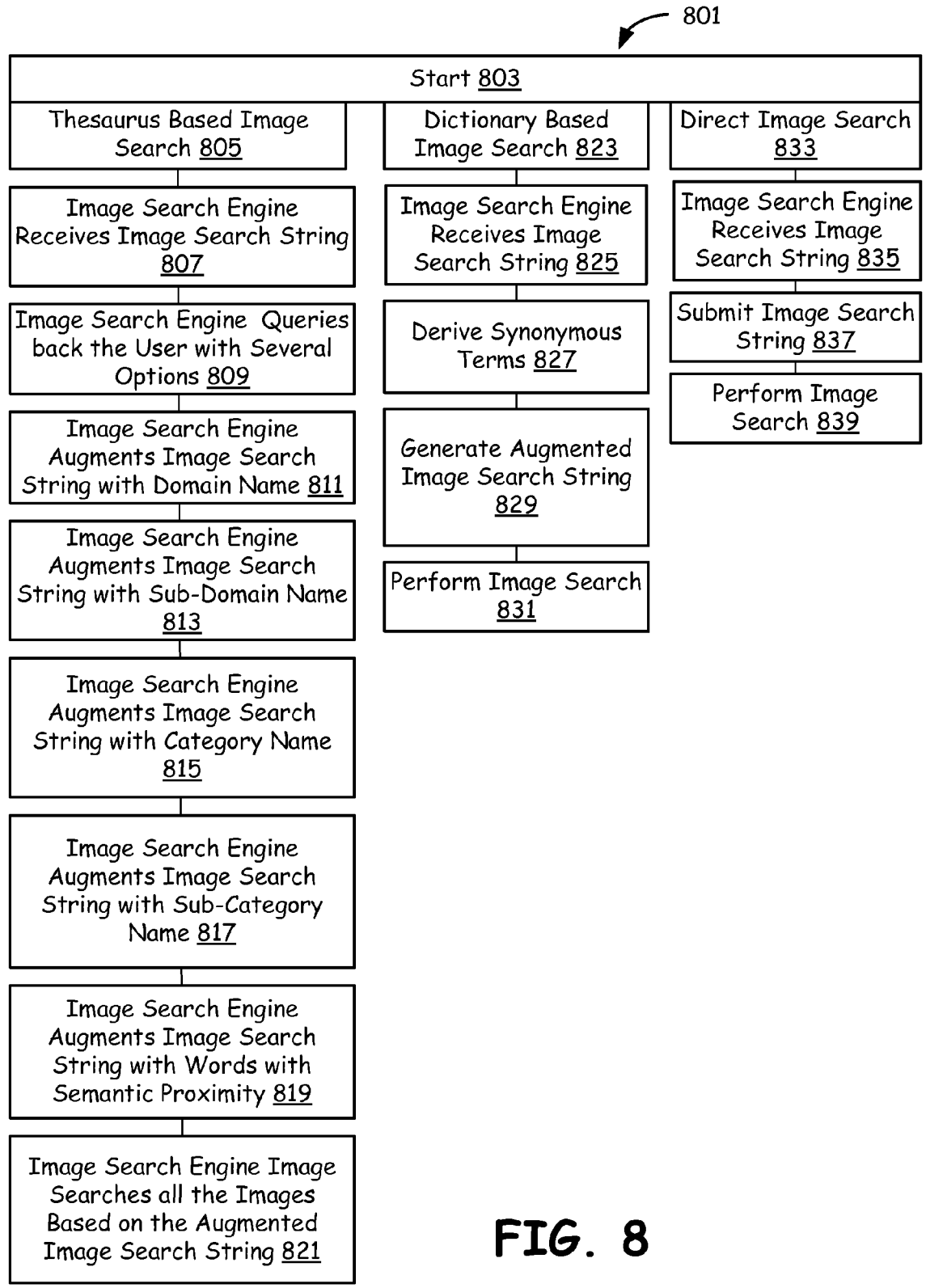
FIG. 8 is a flowchart illustrating the method of operation of the context search engine for generating the search context using a thesaurus (e.g., FIG. 5), or a dictionary (e.g., FIG. 6), in accordance with one embodiment.

FIG. 8 is a flowchart illustrating the method and operations 801 performed by the context image search engine, wherein the search context may be generated using a thesaurus or a dictionary. If none of the options processing enabled by the thesaurus and dictionary are made, the search engine will perform a direct image search based on the search string entered by the user in a right-hand vertical path shown in FIG. 8. In accordance with the present invention, three different image search scenarios are considered for generating the context for the image search on the Internet. It is sometimes important to maintain and provide flexibility for the Internet users that do image searches on the Internet. Flexibility will allow for the best algorithm to be implemented for the user's needs and allow the server to provide images that are close to what they are looking for on the Internet, rather than confusing them with search operations that present them a disordered and chaotic image search results.

A search algorithm based within the image search engine may not perform context-based searches for all types of the search strings used by the user under all the search scenarios. If the user wants the search to be directed based on whatever he enters as the search string, this option is made available as one of the options available to the user. This option is in addition to the context-based image search using the thesaurus-based algorithm (see left hand vertical column of FIG. 8) and the dictionary-based algorithm (see the middle column of FIG. 8). In the flowchart of FIG. 8 the operation of the image search engine for thesaurus based context generation for image search is explained with the four levels hierarchy based thesaurus at FIG. 5.

The flowchart illustrates the method/operations 801 performed by the context search engine, wherein the context may be generated using a thesaurus or a dictionary approach. In one embodiment, after starting at the image search engine at a step 803, a user can chose one option out of three: a thesaurus based search algorithm/image as in steps 805-821, dictionary based search algorithm/image search as in steps 823-831, or a direct search algorithm or image search as in steps 833-839 of FIG. 8.

If the thesaurus context search option is chosen at a step 805, the image search engine receives the image search string at a step 807, via user input and interfacing from the user via one or more client devices. The image search engine sends one or more queries back to the user at the client device, prompting him to select the domains names as explained in the FIG. 5 starting at step 809. As the servers receives successive responses from the user for queries sent by the image search engine, the server augments the image search string with the domain name at 811, sub-domain name at 813, category name at 815, and subcategory name at 817 as shown in FIG. 8 and further shown in a data structure format previously in FIG. 7. Finally, the search engine augments the search string obtained at step 817, with semantically related words listed at the subcategory level of the thesaurus via a step 819, resulting in the final augmented search string used for context-based image search by the image search engine via a step 821.

If the user opts for the dictionary-based context search at 823, the user enters an image search string this is a single dictionary word or a simple concatenation of a few dictionary words. The user-entered search string that is to be processed via the dictionary is received by the image search engine at a step 825 from the user on a client device. Upon receiving the image search string, the context manager 119 of FIG. 1 derives the synonymous words for the words in the search string by performing dictionary lookup(s) at a step 827. Subsequently, the search engine context manager generates an augmented image search string at a step 829. The image search engine performs an image search operation at a step 831 and presents the image searches to the user. In one embodiment, after the construction of the augmented dictionary based search string at 829, the search engine will prompt the user to perform further thesaurus based context generation through query back window. This process can create a more focused or relevant search string or construct, as explained in the previous paragraphs.

If the user has opted for direct search as in steps 833-839, the image search engine does the image search operation with the image search string as entered by the user at a step 835. This option will be helpful, if the entire Internet needs to be searched for the image, which can be of particular interest for the user. The search engine receives the user-entered string as at a step 837, and the image search engine performs the search operation over the entire Internet via a step 839 to display the search results to the user on the client device.

Figure 9:
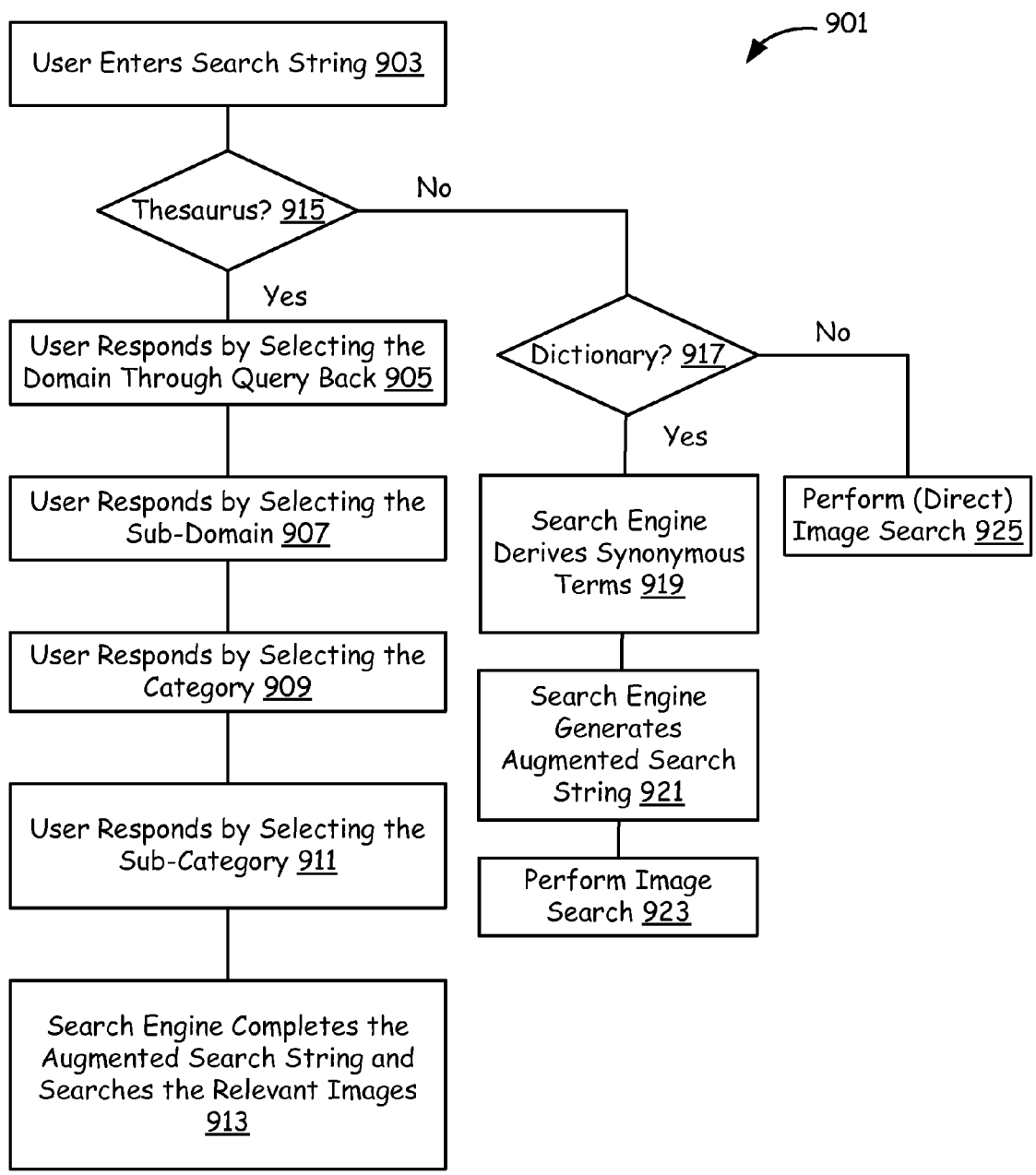
FIG. 9 is a flowchart illustrating a method of incorporating one or more user responses into the algorithms driving the image search engine, in accordance with one embodiment.

FIG. 9 is a flowchart illustrating the method performed by the user in response to the queries sent by the search engine server. This process allows the user to select a multiple choice of, domains, sub-domains, categories, subcategories etc., and names in accordance with one embodiment and allow the user to assist the server in arranging the various selected data in terms of what is included, versus excluded, plus logical search context (or, xor, and, not, within X words from, etc) in some embodiments. In the process of generating a context for the image, the image search engine initiates a series of interactions with the user. This interaction is triggered by the user's entry of the image search string, with an option made in some manner to either go with thesaurus and/or dictionary based context (if any). Subsequently, user will be guided through various interactive steps so that he will select items from the dropdown menu and properly arrange one or more of categories, domains, context, logical connections, etc.

After the user or system makes a selection of type of context generation (thesaurus and/or dictionary) that will be used, the process will continue. In accordance with an example of a thesaurus configuration as discussed in FIG. 5, the user responds to the queries sent by image search engine by simple mouse selections from the dropdown menu in the query back window. For example, in four interactions that occur in sequence, the user performs domain selection, sub-domain selection, category selection, and subcategory selection. If the user elects the dictionary context or the direct search options chosen, user has just to enter the image search string and do only minor (if any) dictionary querying for inclusion of terms, exclusion of terms, and logical connections between terms. The context manager takes care of subsequent search operation, as discussed in FIG. 6 and FIG. 7, earlier.

The flowchart 901 illustrates the method performed by the user in response to the queries sent by the search engine of FIG. 1. The user enters the image search string at a step 903. If the thesaurus-based context generation option is chosen by the user or the system at the decision box 915, the context manager 119 of FIG. 1 will send a query back window to the user or client device, prompting the user with the top-level domain names extracted from the thesaurus. Then, the user will make one or more domain name selections via mouse or keyboard selection at a step 905. Subsequently, the context manger presents one or more queries that prompt the user to select a name of the sub-domain from a dropdown menu for which user does mouse selection of one or more sub-domain names at a step 907. Next, context manger 119 of FIG. 1 prompts the user with a dropdown list of category names, and the user responds by mouse selection of one or more category name at a step 909. Further, the context manager present user with a dropdown list of all the subcategories within the previously selected category. The user does the subcategory selection(s) at a step 911. The search engine context manager derives all the semantically related words within that subcategory and generates the augmented search string as discussed with respect to FIG. 7, and subsequently does the context-based image search operation at a step 913.

At step 915, if the thesaurus-based context is not opted, the user will be looking for the dictionary-based context generation, or this option maybe selected by default if the user entered an image search string which is a dictionary based word or simple phrases of words. In this context, the context manager of the image search engine of FIG. 1 receives the user entered image search string at a step 903. Subsequently, the system derives the synonymous words from one or more dictionary elements at a step 919 in response to the user entered image search string. An augmented image search string is then generated using the synonyms derived from the dictionary at a step 921, as explained in greater detail in FIG. 7. Finally the image search engine performs the image search operation at 923 and presents the image search results to the user, likely displaying them on the client device for review by the user.

At a step 917, if the dictionary option is not made in some form, it is likely the direct search option that has been chosen by the context manager of the image search engine. This option of the image search only requires whatever the image search string a user enters from the search engine instance 205 of FIG. 2 from the client device 211 of FIG. 2. Upon receiving the user entered image search string, the image search engine performs the image search operation at a step 925 using only the image search string, and the results are presented to the user by displaying them on the client device 211 of FIG. 2.

The thesaurus method taught herein can be used for other purposes. For example, the thesaurus hierarchy method may be used to process pictures on the Internet and their surrounding context. If, for example, there is a picture associated with a web page, text, or other content that can be processed using normal grammar processing, then the thesaurus algorithm can process text and information around the picture to get a better idea of what is in the picture. For example, assume there is a picture on a website or news article. We may not know what the picture is and image recognition processing on the pictures and metadata scanning may fail or not be revealing. In this case, the server, which is processing pictures for inclusion into the right node, hierarchy, category of the data structure of FIG. 5 may process surrounding information and text that isn't necessarily more picture data to derive more meaning from the picture. For example, if the text around the picture says, "the motorcycle accident was severe as show in picture 1-1" or if the html indicate some text like "the motorcycle accident was severe" with close proximate reference to a picture with a label in the hrml or xml, then the server can infer what is in the picture. If the server can analyze surrounding data in this matter and accurately infer what is in the picture, such material can be properly placed into the data structure of FIG. 5 and used for processing of image searches, even though the image may be a "black box" or a data item from which we can glean no direct information.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and some features may be merged, split differently, or further segmented in other representations. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. For example, FIG. 9 illustrates that a detection of thesaurus-based processing happens before dictionary based processing. It should be clear that one could perform the same basic algorithm by changing this order and performing dictionary detection before thesaurus detection in some embodiments. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof. Also, thesaurus, as used herein, is intended to mean any module, software, system, or process that takes a search string or input from a user and processes it with feedback from the user to refine the search algorithm or data before or during searching using some form of data structure or computer data and/or query system to refine the search. The process and data structure that enables this image searching can be changed and arrive at similar improved search results for the user. The functional blocks and processes described herein can be performed by custom software, firmware, custom hardware, a general purpose CPU, other execution engine, or some combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An image search server that supports thesaurus-based context searching of images on a plurality of web servers, the image search server adapted to be communicatively coupled to a plurality of client devices that initiate one or more searches, the search server comprising:
   a first portion of a search engine for searching image data contents stored in storage that is associated with the server, the searching occurring in response to the image search server receiving an original search string provided by a client device input;
   a context manager configured to
      select between a thesaurus-based approach and dictionary-based approach based on content of the original search string, wherein the thesaurus-based context approach is selected if the user enters a complex multi-word original search string, otherwise a dictionary based context approach is used for simpler original search string entries;
      generate an augmented search string from the original search string and one or more user's responses to search queries in response to selecting the thesaurus-based approach, and generate an augmented search string based on a dictionary meaning of the original search string in response to selecting the dictionary-based approach;
   a second portion of the image search engine that performs image search operations using the augmented search string to obtain more relevant image search results from image databases;
   a third portion of the image search engine that delivers the more relevant image search results to the user via a server output circuit.

2. The image search server of claim 1 wherein the image search server periodically processes image data over the Internet for inclusion in a thesaurus data structure that can then be used by the image search server when performing image searching using a thesaurus-based approach.

3. The image search server of claim 2 wherein a search approach selected as a default by the context manager can be overridden by user input specifying that an image search is to be performed using one of the following algorithms: (i) a dictionary-based approach where at least one word is parsed from the original search string and related words are processed from the at least one word to create the augmented search string; (ii) a thesaurus-based approach where many words within the original search string are parsed from the original search string and user queries and server hierarchical data structures are accessed by the image search server to process the augmented search string; and (iii) a direct approach where the original search string is used to perform an image search without access to a thesaurus or a dictionary.

4. The image search server of claim 1 wherein:
   the thesaurus-based approach includes thesaurus-based context searching that accesses a hierarchical data structure of image categories and uses responses to user queries to create the augmented search string; and
   the dictionary-based approach includes dictionary-based context searching that uses dictionary accesses to synonymous words in a dictionary database to create the augmented search string.

5. The image search server of claim 1 wherein a thesaurus structure and algorithm is used that generates search engine queries back to the user where the user responds to the queries by selecting hierarchical domain, sub-domain, and category selections from a drop down menu to assist in generation of the augmented search string.

6. The image search server of claim 5, wherein the user responds to not only augment search terms within the augmented search string but to augment logical structure data in the augmented search string to enable a return of more relevant image search results to the user.

7. The image search server of claim 1 wherein the image search engine deletes data from the original search string to arrive at the augmented search string.

8. The image search server of claim 1 wherein the image search engine adds terms and logical operators to the original search string to create the augmented search string.

9. The image search server of claim 1 wherein the image search engine contains a module for receiving the original search string from a user, a module for processing additional user queries to enable refinement of the original search string, and a module for generating the augmented search string using data collected by the module for processing additional user queries.

10. The image search server of claim 1 wherein the image search engine traverses only a portion of a thesaurus data structure to derive the augmented search string.

11. A search engine capable of searching the image contents from a built-in dictionary-based context, the search engine comprising:
   an image search string receiver to receive an original image search string entered by a user;
   a context manager configured to use both a thesaurus-based approach and a dictionary based approach, wherein:
      the dictionary based approach includes generating an augmented image search string from at least one word within the original image search string using at least one synonymous term for the at least one word that is accessed from the dictionary;
      the thesaurus based approach includes generating an augmented image search string using many words within the original search string and one or more user's responses to queries;

a search module that performs a search operation based on the augmented image search string to deliver image search result to the user.

12. The search engine of claim 11, wherein the augmented image search string is based on one or more dictionary entries having several stored synonyms for a word in the original image search string and wherein logical operators within the augmented image search string can be derived from the search engine through user queries.

13. A method performed by an image search engine to perform an image search, the method comprising the steps of:
receiving an original search string from a server input;
determining whether a thesaurus-based approach or a dictionary-based approach is selected;
in response to determining that a thesaurus-based approach is selected:
sending various queries out through an output of the image search engine to receive additional user input from a server input, the additional user input allowing the image search engine to select augmenting information from a hierarchical database within storage associated with the image search engine where that augmenting information can be used to augment the original search string into an augmented search string;
performing a search of image databases using the augmented search string to generate a list of image search results from the image databases that correlate favorably with the augmented search string; and
providing image search result information to an output of the server;
in response to determining that that a dictionary-based approach is selected,
parsing at least one dictionary word from the original search string;
using the at least one dictionary word to access a dictionary database that finds related words for the at least one dictionary word, and using the related words to generate an augmented search string;
performing a search of image databases using the augmented search string to generate a list of image search results from the image databases that correlate favorably with the augmented search string; and
providing image search result information to an output of the server.

14. The method of claim 13 wherein the image search engine also uses the additional user input to set at least one logical construct of the augmented search string to optimize search results for a user.

15. The method of claim 13 wherein the image search engine scans a thesaurus database of multiple hierarchically connected image topic domains and categories to formulate the various queries to arrive at the additional user input that can be used to create the augmented search string.

16. The method of claim 13 wherein the image search engine performs image search operations using context derived from one of a thesaurus database or a dictionary database to create the augmented search string, and performs image search operations based on the augmented search string.

17. The method of claim 13 wherein the image search engine performs image search operations using context derived from both a thesaurus database and a dictionary database to create the augmented search string, and performs image search operations based on the augmented search string.

18. A computing device that is adapted to be connected to a network, whereby the computing device supports image search engine operations, the computing device comprising:
a communication interface for providing information into and out from the computing device;
storage associated with the computing device; and
processing circuitry coupled to the communication interface and to the storage, the processing circuitry, storage, and communication interface operable to:
receive an image search criteria from the communication interface;
augment the image search criteria to create an augmented image search criteria by using both a thesaurus hierarchical image database and a dictionary-related word database stored in storage and by using input from user queries that are communicated through the communication interface;
perform a search of image database information using the augmented image search criteria to formulate a list of image search results in priority order; and
output image search result information through the communication interface for eventual use by an end user.

* * * * *